United States Patent [19]

Cawthon et al.

[11] Patent Number: 5,549,345
[45] Date of Patent: Aug. 27, 1996

[54] DASHBOARD VENT COVER

[76] Inventors: Albert V. Cawthon; Rudolph J. Baur, both of c/o PHC Industries, Inc., Camden, N.J. 08103

[21] Appl. No.: 490,419

[22] Filed: Jun. 14, 1995

[51] Int. Cl.⁶ .................................................. A60K 37/04
[52] U.S. Cl. ........................ 296/70; 296/208; 454/127; 52/791.1; 403/393; 403/265
[58] Field of Search ................ 296/70, 208; 454/69, 454/127; 52/95, 198, 791.1, 796.1; 160/380, 179; 403/393, 13, 265

[56] References Cited

U.S. PATENT DOCUMENTS

| | | | |
|---|---|---|---|
| 2,580,231 | 12/1951 | Lamm | 403/265 |
| 3,483,912 | 12/1969 | Andrews | 160/380 |
| 4,646,879 | 3/1987 | Mahler et al. | 454/127 |
| 4,668,004 | 5/1987 | Tsunoda et al. | 296/70 |
| 5,026,351 | 11/1991 | Kloster | 454/127 |

FOREIGN PATENT DOCUMENTS

| | | | |
|---|---|---|---|
| 36925 | 10/1981 | European Pat. Off. | 296/70 |
| 220644 | 4/1985 | Germany | 52/198 |
| 1126485 | 11/1984 | U.S.S.R. | 296/70 |

*Primary Examiner*—Gary C. Hoge
*Attorney, Agent, or Firm*—Zachary T. Wobensmith, III

[57] ABSTRACT

A vent cover for automotive type dashboards which includes a length of expanded plastic mesh which is sandwiched between a strip of vinyl and a strip of vinyl reinforced fabric which go around the perimeter of the mesh, and are engaged by a plurality of rivets which are around the perimeter of the vent opening on the underside of the dashboard, extend through holes in the strips, and which rivets are staked by a heated die.

3 Claims, 2 Drawing Sheets

DASHBOARD VENT COVER

BACKGROUND OF THE INVENTION

1. Field of the Invention

This invention relates to a vent cover for automotive type dashboards which is of the type that is mechanically secured to the underside of the dashboard.

2. Description of the Prior Art

Automotive type dashboards as used on cars and trucks are provided with a variety of openings which are connected by ducts to the vehicle heating and air conditioning system to provide cold or heated air to the interior of the vehicle. Some of these openings are provided with adjustable louvers which are used to direct the flow of air at the disgression of the vehicle occupants. For clearing the windshield, it is desirable to provide fixed vents to obtain maximum utilization of the vehicle heating and air conditioning system. Windshield vents are located close to the windshield, which puts them in a location that is not readily accessible and if left open, objects placed on the dash can fall into the vent openings and interfere with the system's operation. It has been proposed to cover the vent openings with a strip of mesh secured to the underside of the dashboard by a length of double sided adhesive coated butyl tape. This solution is expensive, the butyl tape and mesh must be applied by hand, and present problems of separation, which may result from placement of articles on the cover, from inadequate adhesive bonding or from excessive heat build up inside the vehicle which causes the adhesive to melt. Replacement of the vent cover would require removal of the dash board, which also increases the overall cost associated with adhesive retained vent covers.

The vent cover of the invention is not subject to the problems of the prior art vent covers, and provides distinct advantages.

SUMMARY OF THE INVENTION

This invention relates to vent covers for attachment to the underside of vent openings in automotive dashboards, which include a length of plastic mesh, which has its perimeter sandwiched between dielectrically bonded strips of an inner layer of vinyl plastic and an outer layer of fabric reinforced vinyl plastic. Rivets located around the perimeter of the vent opening extend through the mesh and strips and are staked by heat and pressure.

The principal object of the invention is to provide vent covers for vent openings in automotive dash boards that are secured to the underside of the dashboard by a plurality of rivets.

A further object of the invention is to provide vent covers of the character aforesaid which are simple and inexpensive to construct.

A further object of the invention is to provide vent covers of the character aforesaid which are easy to install, durable and long lasting in use.

A further object of the invention is to provide vent covers of the character aforesaid which provide both material and labor savings over previously available vent covers.

A further object of the invention is to provide vent covers of the character aforesaid whose installation is faster and better suited to mass production than previously available vent covers.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

Figure 1:
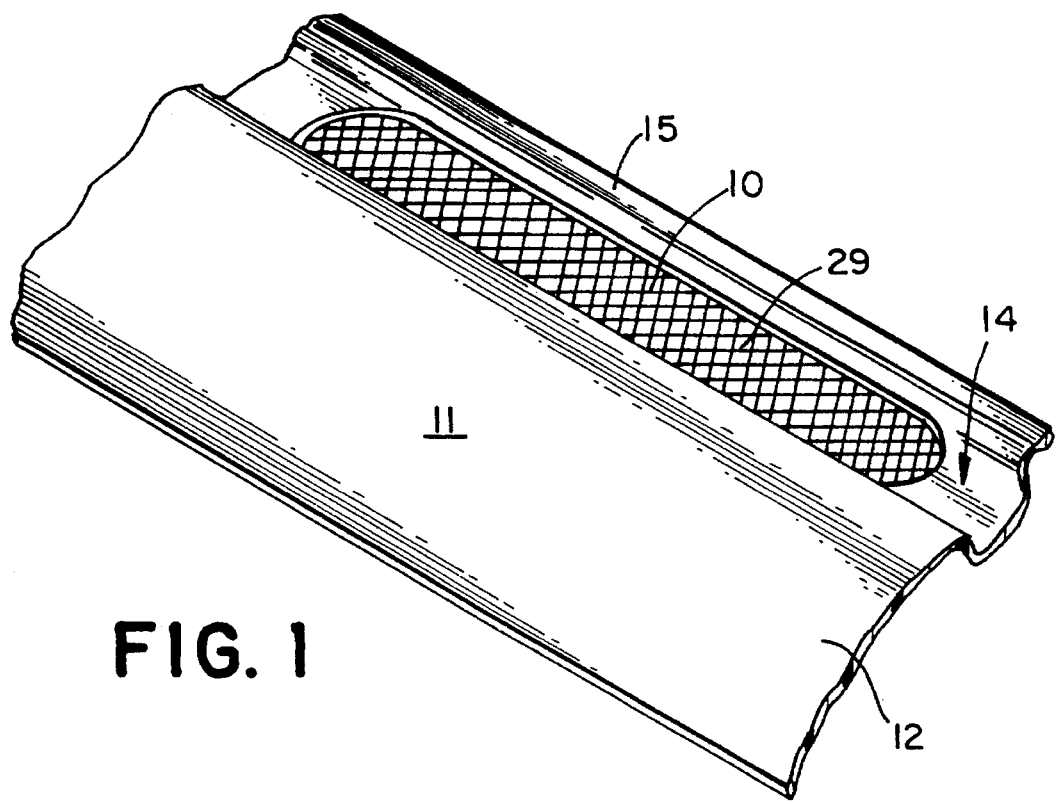
FIG. 1 is a view in perspective of a portion of a dashboard from the top showing the vent cover of the invention as installed.
Figure 2:
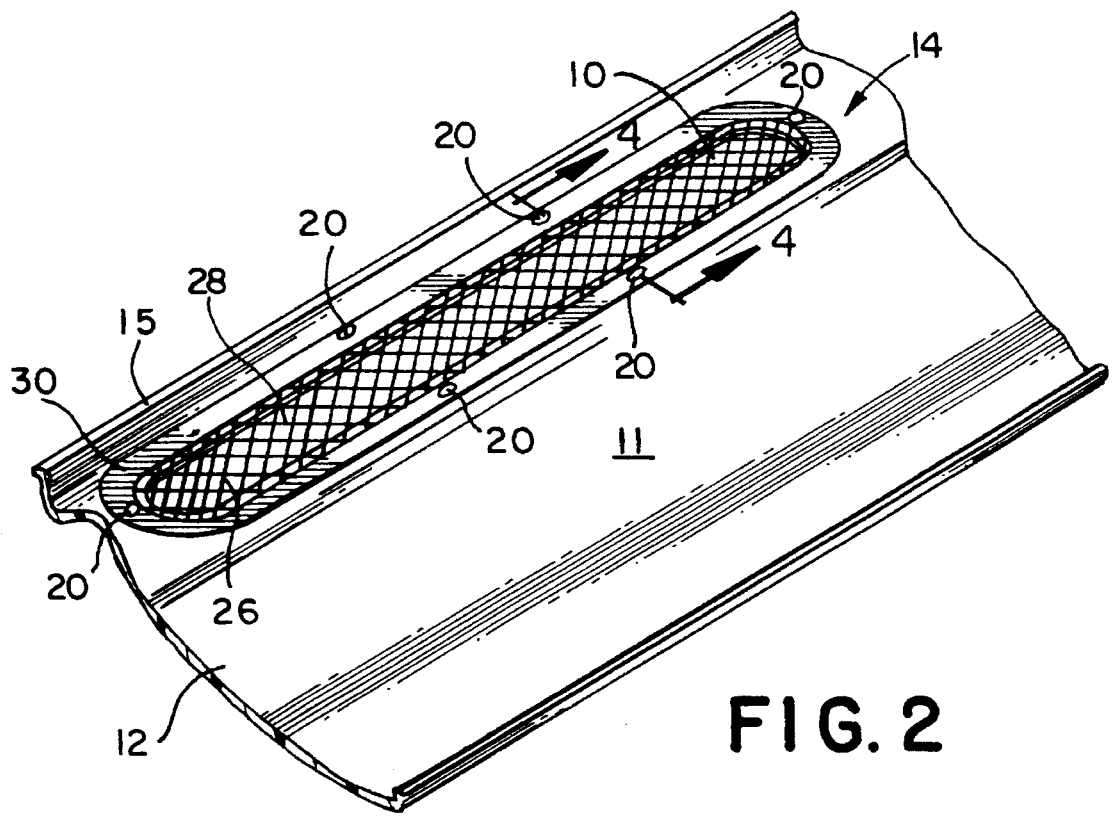
FIG. 2 is a view similar to FIG. 1, but showing the invention from the underside of the dashboard.

It should, of course, be understood that the description and drawings herein are merely illustrative and that various modifications and changes can be made in the structure disclosed without departing from the spirit of the invention.

Like numerals refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result.

Referring now more particularly to FIGS. 1–4 inclusive, a vent cover 10 is illustrated in conjunction with an automotive dashboard panel 11.

The panel 11 is formed of a synthetic plastic such as A.B.S. which may be injection molded. The panel 11 has a front curved portion 12 from which a trough 14 extends, and which has a lip 15. The trough 14 has an oblong vent opening 16 therethrough which is normally connected to a duct (not shown) from the vehicle heating and air conditioning system (not shown) to supply heated or cooled air to the windshield.

Figure 4:
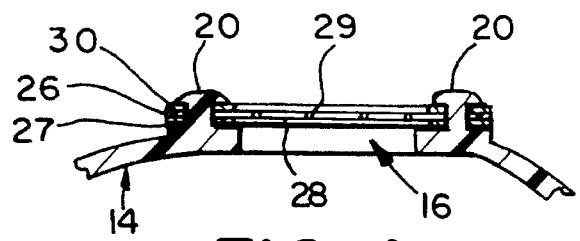
FIG. 4 is a vertical sectional view, enlarged, taken approximately on the line 4—4 of FIG. 2.

As seen more particularly in FIG. 4 a plurality of rivets 20 are provided spaced around the perimeter of the vent opening 16 on the underside of panel 11. While six rivets 20 are illustrated, the number and spacing are dependent upon the dimensions of the vent opening 16, and the amount of support required.

Figure 3:
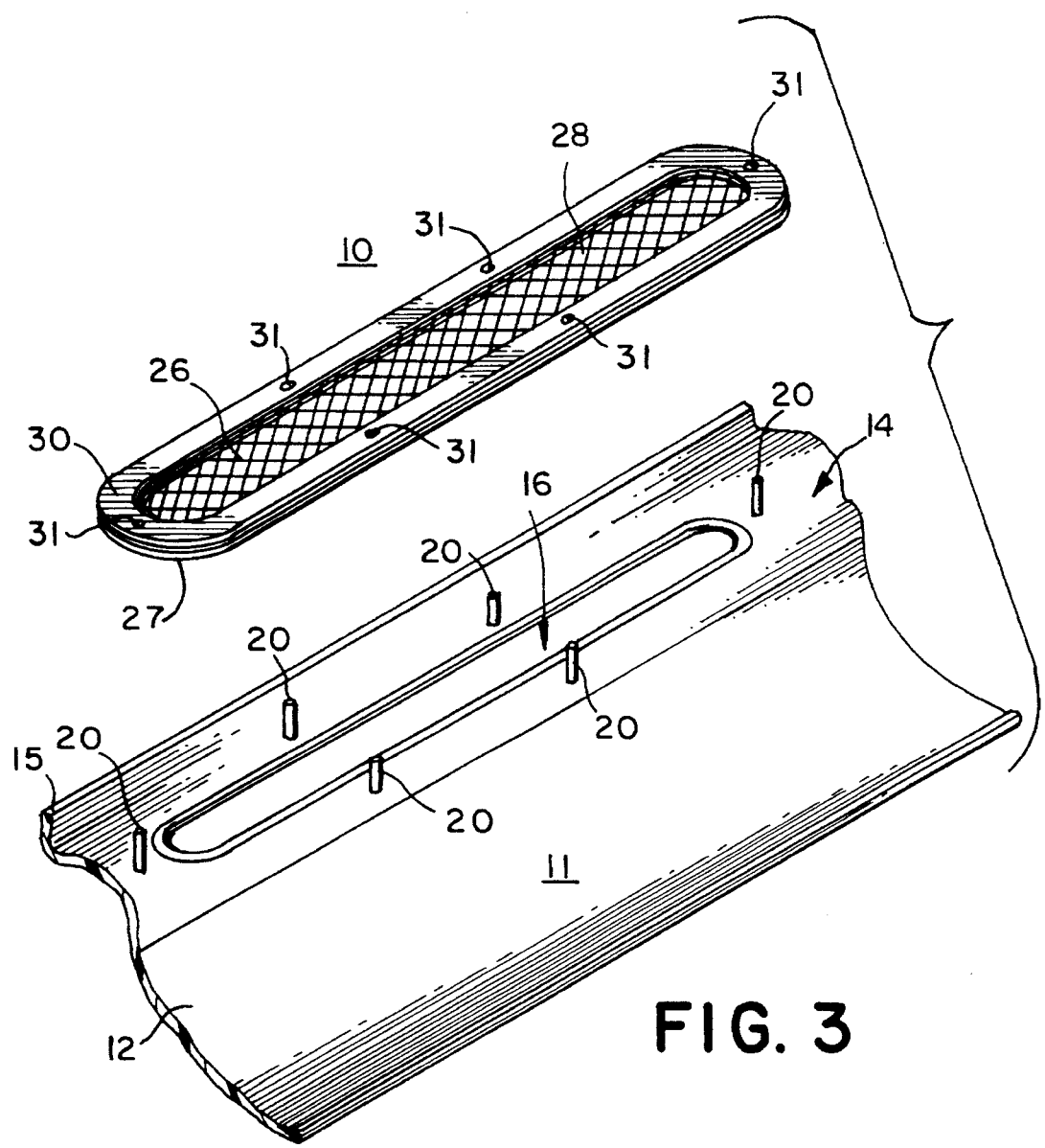
FIG. 3 is an exploded perspective view showing the dashboard from the underside.

The vent cover 10 as illustrated in FIG. 3 is separated from panel 11, and is in position for assembly to the panel 11. The cover 10 includes a length of plastic mesh 26, which is preferably of expanded nylon, polypropylene, or polyethylene, but can be any suitable material which is capable of being dielectrically bonded. The mesh 26 has a strip 27 of plastic extending around its perimeter on the side 28 which faces the dashboard panel 11, which is preferably vinyl plastic. The cover 10 also includes a strip 30 of plastic supported reinforcement fabric which extends around the perimeter of the cover 10 on the side 29 of cover 10 which faces away from panel 11. The fabric 30 plastic is preferably vinyl plastic, but can be any plastic that is capable of being dielectrically bonded to the mesh 26. The strips 27 and 30 are provided with a plurality of openings 31 spaced around the perimeter of cover 10 to correspond with the spacing of the rivets 20 around vent opening 16. The strip 27 and strip 30 are dielectrically bonded to mesh 26 in well known manner.

To assemble cover 10 to panel 11 as illustrated in FIG. 3, the cover 10 is placed over the rivets 20 with strip 27 against panel 11, and with the rivets 20 extending through openings 31. A heated die (not shown) contacts the rivets 20, melts them and forces them down onto fabric 30 securing the cover 10 against panel 11. The die (not shown) is withdrawn and the panel 11 is ready for further operations and/or installation in a vehicle.

It will thus be seen that a vent cover has been provided with which the objects of the invention are achieved.

We claim:

1. In combination with a dashboard panel for use in an automotive vehicle which dashboard panel has a top and an underside with at least one vent opening extending therethrough to supply heated or cooled air to the interior of the vehicle, the improvement which comprises:

a vent cover which includes a length of plastic mesh;

said cover having a strip around the perimeter of the mesh;

a plurality of spaced rivets on the underside of said panel and extending from said panel around the perimeter of said opening;

said rivets being capable of deformation by heat and pressure; and a plurality of spaced openings in said strip which are engaged by said rivets to retain said cover to said panel.

2. A dashboard panel as described in claim 1 in which said cover strip includes a reinforcement strip of plastic supported fabric on one side of the plastic mesh, and a strip of plastic on the other side of said plastic mesh, both strips being dielectrically bonded together with said mesh therebetween.

3. A dashboard panel as described in claim 1 in which said plastic mesh is of expanded nylon, said reinforcement strip plastic is vinyl plastic, and said plastic strip is vinyl plastic.

* * * * *